(12) United States Patent
Hanson et al.

(10) Patent No.: US 6,903,679 B2
(45) Date of Patent: Jun. 7, 2005

(54) VIDEO AMPLIFIER FOR A RADAR RECEIVER

(75) Inventors: James T. Hanson, Maynard, MA (US); Walter Gordon Woodington, Lincoln, MA (US); Michael Joseph Delcheccolo, Westford, MA (US); Joseph S. Pleva, Londonderry, NH (US); Mark E. Russell, Westford, MA (US); H. Barteld Van Rees, Needham, MA (US)

(73) Assignee: Raytheon Company, Waltham, MA (US)

( * ) Notice: Subject to any disclaimer, the term of this patent is extended or adjusted under 35 U.S.C. 154(b) by 439 days.

(21) Appl. No.: 09/931,593

(22) Filed: Aug. 16, 2001

(65) Prior Publication Data

US 2003/0210182 A1 Nov. 13, 2003

Related U.S. Application Data

(60) Provisional application No. 60/226,160, filed on Aug. 16, 2000.

(51) Int. Cl.$^7$ .............................. G01S 13/00; G01S 7/00
(52) U.S. Cl. .............................. 342/91; 342/70; 342/89; 342/92; 342/175; 342/195; 342/205
(58) Field of Search ....................... 342/70–72, 82–103, 342/159–164, 175–205; 380/38, 39, 40, 275, 276, 59; 375/211, 229, 230–236; 330/1 R, 250, 289

(56) References Cited

U.S. PATENT DOCUMENTS

| | | | | |
|---|---|---|---|---|
| 2,830,257 | A | * | 4/1958 | Denz .......................... 330/289 |
| 2,939,918 | A | * | 6/1960 | Freedman et al. .......... 342/187 |
| 3,465,336 | A | * | 9/1969 | Rittenbach et al. ........... 342/91 |
| 3,641,451 | A | | 2/1972 | Hollingsworth et al. |
| 3,697,985 | A | | 10/1972 | Faris et al. |

(Continued)

FOREIGN PATENT DOCUMENTS

| | | |
|---|---|---|
| DE | 196 32 889 | 2/1998 |
| DE | 195 23 693 | 5/1998 |
| DE | 198 55 400 | 12/1998 |
| DE | 198 50 128 | 5/1999 |
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |
| JP | 60171818 A2 | 9/1985 |
| JP | 64-007119 | 1/1989 |
| JP | 64-016111 | 1/1989 |

OTHER PUBLICATIONS

Barnett, Roy I. et al. "A Feasibility Study of Stripline–Fed Slots Arranged as a Planar Array with Circular Grid and Circular Boundary", IEEE, 1989, pp. 1510–1515.

(Continued)

*Primary Examiner*—Bernarr E. Gregory
(74) *Attorney, Agent, or Firm*—Daly, Crowley, Mofford & Durkee, LLP (57) ABSTRACT

A video amplifier for a radar receiver includes a temperature compensating attenuator. The attenuator includes a temperature sensitive device, such as a thermistor, arranged in a voltage divider network and is coupled in cascade between two filter stages. Each of the filter stages has a bandpass characteristic in order to filter low-frequency leakage signals and provide sensitivity control based on frequency and thus range, while also filtering high frequency signals to reduce aliasing.

20 Claims, 7 Drawing Sheets

U.S. PATENT DOCUMENTS

| | | | |
|---|---|---|---|
| 3,701,154 A | * 10/1972 | McKinney | 342/93 |
| 3,866,136 A | 2/1975 | Augustin et al. | |
| 3,875,399 A | * 4/1975 | Teich | 342/175 |
| 3,935,559 A | 1/1976 | Straffon et al. | |
| 3,940,696 A | 2/1976 | Nagy | |
| 3,942,181 A | * 3/1976 | Berrod et al. | 342/92 |
| 3,974,501 A | 8/1976 | Ritzie | |
| 3,978,481 A | 8/1976 | Angwin et al. | |
| 3,987,402 A | * 10/1976 | Smith | 342/175 |
| 4,003,049 A | 1/1977 | Sterzer et al. | |
| 4,008,473 A | 2/1977 | Hinachi et al. | |
| 4,008,475 A | 2/1977 | Johnson | |
| 4,019,150 A | 4/1977 | Lurey et al. | |
| 4,035,797 A | 7/1977 | Nagy | |
| 4,063,243 A | 12/1977 | Anderson et al. | |
| 4,067,013 A | * 1/1978 | Smith | 342/91 |
| 4,079,377 A | 3/1978 | zur Heiden et al. | |
| 4,101,841 A | 7/1978 | Okada et al. | |
| 4,143,370 A | 3/1979 | Yamanaka et al. | |
| 4,209,791 A | 6/1980 | Gerst et al. | |
| 4,217,582 A | 8/1980 | Endo et al. | |
| 4,246,585 A | 1/1981 | Mailloux | |
| 4,308,536 A | 12/1981 | Sims, Jr. et al. | |
| 4,348,675 A | 9/1982 | Senzaki et al. | |
| 4,349,823 A | 9/1982 | Tagami et al. | |
| 4,409,899 A | 10/1983 | Owen et al. | |
| 4,414,550 A | 11/1983 | Tresselt | |
| 4,507,662 A | 3/1985 | Rothenberg et al. | |
| 4,543,577 A | 9/1985 | Tachibana et al. | |
| 4,549,181 A | 10/1985 | Tachibana et al. | |
| 4,622,636 A | 11/1986 | Tachibana | |
| 4,673,937 A | 6/1987 | Davis | |
| 4,703,429 A | 10/1987 | Sakata | |
| 4,718,558 A | 1/1988 | Castaneda | |
| 4,901,083 A | 2/1990 | May et al. | |
| 4,962,383 A | 10/1990 | Tresselt | |
| 4,970,653 A | 11/1990 | Kenue | |
| 4,992,753 A | 2/1991 | Jenson et al. | |
| 4,994,809 A | 2/1991 | Yung et al. | |
| 5,008,678 A | 4/1991 | Herman | |
| 5,014,200 A | 5/1991 | Chundrlik et al. | |
| 5,023,617 A | 6/1991 | Deering | |
| 5,045,856 A | 9/1991 | Paoletti | |
| 5,115,245 A | 5/1992 | Wen et al. | |
| 5,132,632 A | 7/1992 | Russell et al. | |
| 5,134,411 A | 7/1992 | Adler | |
| 5,138,321 A | 8/1992 | Hammer | |
| 5,173,859 A | 12/1992 | Deering | |
| 5,177,453 A | 1/1993 | Russell et al. | |
| 5,189,426 A | 2/1993 | Asbury et al. | |
| 5,235,316 A | 8/1993 | Qualizza | |
| 5,249,027 A | 9/1993 | Mathur et al. | |
| 5,249,157 A | 9/1993 | Taylor | |
| 5,252,981 A | 10/1993 | Grein et al. | |
| 5,268,692 A | 12/1993 | Grosch et al. | |
| 5,280,288 A | 1/1994 | Sherry et al. | |
| 5,285,207 A | 2/1994 | Asbury et al. | |
| 5,302,956 A | 4/1994 | Asbury et al. | |
| 5,315,303 A | 5/1994 | Tsou et al. | |
| 5,325,096 A | 6/1994 | Pakett | |
| 5,325,097 A | 6/1994 | Zhang et al. | |
| 5,339,075 A | 8/1994 | Abst et al. | |
| 5,341,144 A | 8/1994 | Stove | |
| 5,351,044 A | 9/1994 | Mathur et al. | |
| RE34,773 E | 11/1994 | Dombrowski | |
| 5,390,118 A | 2/1995 | Margolis et al. | |
| 5,394,292 A | 2/1995 | Hayashida | |
| 5,396,252 A | 3/1995 | Kelly | |
| 5,400,864 A | 3/1995 | Winner et al. | |
| 5,410,745 A | 4/1995 | Friesen et al. | |
| 5,414,643 A | 5/1995 | Blackman et al. | |
| 5,451,960 A | 9/1995 | Kastella et al. | |
| 5,454,442 A | 10/1995 | Labuhn et al. | |
| 5,467,072 A | 11/1995 | Michael | |
| 5,467,283 A | 11/1995 | Butsuen et al. | |
| 5,471,214 A | 11/1995 | Faibish et al. | |
| 5,479,173 A | 12/1995 | Yoshioka et al. | |
| 5,481,268 A | 1/1996 | Higgins | |
| 5,483,453 A | 1/1996 | Uemura et al. | |
| 5,485,155 A | 1/1996 | Hibino | |
| 5,485,159 A | 1/1996 | Zhang et al. | |
| 5,486,832 A | 1/1996 | Hulderman | |
| 5,493,302 A | 2/1996 | Woll et al. | |
| 5,495,252 A | 2/1996 | Adler | |
| 5,508,706 A | 4/1996 | Tsou et al. | |
| 5,517,196 A | 5/1996 | Pakett et al. | |
| 5,517,197 A | 5/1996 | Algeo et al. | |
| 5,521,579 A | 5/1996 | Bernhard | |
| 5,530,447 A | 6/1996 | Henderson et al. | |
| 5,572,428 A | 11/1996 | Ishida et al. | |
| 5,583,495 A | 12/1996 | Ben Lu Lu | |
| 5,587,908 A | 12/1996 | Kajiwara | |
| 5,613,039 A | 3/1997 | Wang et al. | |
| 5,619,208 A | 4/1997 | Tamatsu et al. | |
| 5,625,362 A | 4/1997 | Richardson | |
| 5,627,510 A | 5/1997 | Yuan | |
| 5,633,642 A | 5/1997 | Hoss et al. | |
| 5,654,715 A | 8/1997 | Hayashikura et al. | |
| 5,670,963 A | 9/1997 | Kubota et al. | |
| 5,675,345 A | 10/1997 | Pozgay et al. | |
| 5,678,650 A | 10/1997 | Ishihara et al. | |
| 5,689,264 A | 11/1997 | Ishikawa et al. | |
| 5,712,640 A | 1/1998 | Andou et al. | |
| 5,715,044 A | 2/1998 | Hayes | |
| 5,717,399 A | 2/1998 | Urabe et al. | |
| 5,719,580 A | 2/1998 | Core | |
| 5,731,778 A | 3/1998 | Nakatani et al. | |
| 5,734,344 A | 3/1998 | Yamada | |
| 5,757,074 A | 5/1998 | Matloubian et al. | |
| 5,757,307 A | 5/1998 | Nakatani et al. | |
| 5,767,793 A | 6/1998 | Agravante et al. | |
| 5,771,007 A | 6/1998 | Arai et al. | |
| 5,777,563 A | 7/1998 | Minissale et al. | |
| 5,805,103 A | 9/1998 | Doi et al. | |
| 5,808,561 A | 9/1998 | Kinoshita et al. | |
| 5,808,728 A | 9/1998 | Uehara | |
| 5,818,355 A | 10/1998 | Shirai et al. | |
| 5,839,534 A | 11/1998 | Chakraborty et al. | |
| 5,905,472 A | 5/1999 | Wolfson et al. | |
| 5,923,280 A | 7/1999 | Farmer | |
| 5,926,126 A | 7/1999 | Engelman | |
| 5,929,802 A | 7/1999 | Russell et al. | |
| 5,938,714 A | 8/1999 | Satonaka | |
| 5,940,011 A | 8/1999 | Agravante et al. | |
| 5,949,366 A | 9/1999 | Herrmann | |
| 5,959,570 A | 9/1999 | Russell | |
| 5,977,904 A | 11/1999 | Mizuno et al. | |
| 5,978,736 A | 11/1999 | Greendale | |
| 5,999,092 A | 12/1999 | Smith et al. | |
| 5,999,119 A | 12/1999 | Carnes et al. | |
| 5,999,874 A | 12/1999 | Winner et al. | |
| 6,011,507 A | 1/2000 | Curran et al. | |
| 6,018,308 A | 1/2000 | Shirai | |
| 6,026,347 A | 2/2000 | Schuster | |
| 6,026,353 A | 2/2000 | Winner | |
| 6,028,548 A | 2/2000 | Farmer | |
| 6,037,860 A | 3/2000 | Zander et al. | |
| 6,037,894 A | 3/2000 | Pfizenmaier et al. | |
| 6,040,796 A | 3/2000 | Matsugatani et al. | |
| 6,043,772 A | 3/2000 | Voigtlaender et al. | |
| 6,049,257 A | 4/2000 | Hauk | |

| | | |
|---|---|---|
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,240 A | 8/2000 | Lapushin |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |
| 6,114,985 A | 9/2000 | Russell et al. |
| 6,127,965 A | 10/2000 | McDade et al. |
| 6,130,607 A | 10/2000 | McClanahan et al. |
| 6,147,637 A | 11/2000 | Morikawa et al. |
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,269,298 B1 | 7/2001 | Seto |
| 6,278,400 B1 | 8/2001 | Cassen et al. |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,366,235 B1 | 4/2002 | Mayer et al. |

OTHER PUBLICATIONS

Bhattacharyya, Arum, et al. "Analysis of Srripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot Antenna Developed for Time–Domail Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, A lan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–1426.

International Search Report of PCT Application No. PCT/US01/42065 dated May 14, 2002.

International Search Report of PCT Application No. PCT/US01/25594 dated May 7, 2002.

G.S. Dow, et al., "Monolithic Receivers with Integrated Temperature Compensation Function", IEEE GaAs IC Symposium, 1991, pp. 267–269.

International Search Report of PCT Application No. PCT/US01/25682 dated May 14, 2002.

International Search Report of PCT Application No. PCT/US01/25677 dated Apr. 17, 2002.

International Search Report of PCT Application No. PCT/US01/25638 dated May 7, 2002.

International Search Report of PCT Application No. PCT/US01/25676 dated Dec. 21, 2001.

* cited by examiner

VIDEO AMPLIFIER FOR A RADAR RECEIVER

CROSS-REFERENCE TO RELATED APPLICATIONS

This application claims the benefit of U.S. Provisional Application No. 60/226,160, filed on Aug. 16, 2000 and is hereby incorporated herein by reference in its entirety.

STATEMENTS REGARDING FEDERALLY SPONSORED RESEARCH

Not applicable.

FIELD OF THE INVENTION

This invention relates generally to radar systems and more particularly to a radar receiver having a video amplifier with temperature compensation.

BACKGROUND OF THE INVENTION

As is known in the art, radar receivers include circuitry for receiving electromagnetic radiation reflected by objects within a field of view of the radar system. Typical functions of a radar receiver include signal amplification at radio frequencies (RF), down-conversion to convert the RF frequency of the received signal to a lower, video frequency, signal filtering, and analog-to-digital conversion to provide a digital signal for further processing, such as by a Digital Signal Processor (DSP), in order to detect an object within the field of view. Typically, one or more RF preamplifiers, or simply amplifiers are provided in the receive signal path prior to (i.e., upstream of) the down-conversion. A video amplifier located downstream of the down-converter introduces additional gain and generally, has a low pass characteristic in order to reduce aliasing. Aliasing is a phenomena that occurs when the frequency of operation of the analog-to-digital converter is less than two times the frequency of the input signal. The result of aliasing is that the converted signal has ambiguous spurious responses of the input signal.

Such a radar receiver suffers from several design challenges. In the case of a bistatic radar system (i.e., a radar system having separate transmit and receive antennas, typically positioned proximate one another), a leakage signal corresponding to a portion of the RF signal emitted from the transmit antenna is coupled to the receive antenna without intercepting an object. Since the sensitivity of the radar system may be limited by the noise accompanying the portion of the transmitted signal which leaks into the receiver, conventionally such a leakage signal is filtered prior to processing the return signals.

A further challenge in designing a radar receiver is to compensate for temperature induced gain variations in the RF amplifier, which can be significant particularly in the case of a gallium arsenide (GaAs) amplifier. One way of compensating for temperature induced gain changes is to control the bias to the RF amplifier and thus its gain with a temperature varying voltage. However, this approach adversely affects the dynamic range of the receiver. Another approach used to compensate for temperature induced gain changes in the RF amplifier is to use a PIN diode attenuator in the RF portion of the receiver, with the gain of the PIN diodes controlled by a temperature sensitive device. However, PIN diodes are relatively expensive and add undesirable complexity to the circuit.

SUMMARY OF THE INVENTION

According to the invention, a video amplifier is provided with a first filter stage having an input terminal adapted to receive an RF signal and an output terminal, an attenuator having an input terminal coupled to the output terminal of the first filter stage and an output terminal, and a second filter stage having an input terminal coupled to the output terminal of the attenuator and an output terminal at which an output signal of the video amplifier is provided. The attenuator includes a temperature sensitive device, such as a thermistor. This arrangement provides a relatively simple and inexpensive way to compensate for temperature induced gain variations in an RF amplifier. This is because the temperature compensation is implemented in the low video frequency amplifier and thus, can be achieved with a relatively inexpensive thermistor arranged in a simple voltage divider network. By compensating for temperature induced gain variations, the dynamic range over which the analog-to-digital converter must operate is reduced.

In one embodiment, each of the first and second filter stages has a bandpass characteristic generated by high and low pass filters. Attenuation of low frequency signals advantageously reduces leakage signals which can occur in bistatic radar systems. Further, in the illustrative FMCW radar system, low frequency attenuation is used to vary the sensitivity of the radar receiver as a function of frequency and thus, range in such a way that the amplified radar return is substantially independent of range.

Also described is a radar receiver including an RF amplifier providing an amplified RF signal, a down-converter for converting the amplified RF signal to provide a lower frequency signal, and a video amplifier. The video amplifier includes a temperature compensating attenuator, as described above.

A radar system according to the invention includes a transmit antenna for transmitting a first RF signal, a receive antenna for receiving a second RF signal, and a receiver circuit for processing the second RF signal and including a temperature compensated video amplifier. In one embodiment, the temperature compensated video amplifier includes an attenuator having a temperature sensitive device and being coupled in cascade between first and second filter stages, as described above. Preferably, the attenuator gain varies over a predetermined temperature range by approximately the same amount the gain of an RF amplifier contained in the receiver circuit.

In one embodiment, the radar system further includes an analog-to-digital converter responsive to the output signal of the video amplifier for providing a digital signal, a temperature sensor to provide a signal indicative of the temperature of the receiver, and a digital signal processor. The digital signal processor is responsive to the temperature indicative signal for varying a threshold used to process the digital signal. With this arrangement, a final temperature compensation can be made by the digital signal processor to eliminate any temperature induced gain variations in the RF amplifier which are not compensated by the video amplifier.

According to a further aspect of the invention, the first and second filter stages of the video amplifier have a bandpass characteristic provided by high and low pass filters. With this arrangement, the video amplifier not only reduces aliasing due to its attenuation of high frequency signals, but also reduces the effects of leakage signals due to its attenuation of low frequency signals. The low frequency attenuation further serves to vary the sensitivity of the radar receiver as a function of frequency and thus, range in such a way that the amplified radar return signal is substantially independent of range.

BRIEF DESCRIPTION OF THE DRAWINGS

The foregoing features of this invention, as well as the invention itself, may be more fully understood from the following description of the drawings in which.

DESCRIPTION OF THE PREFERRED EMBODIMENT

Figure 1:
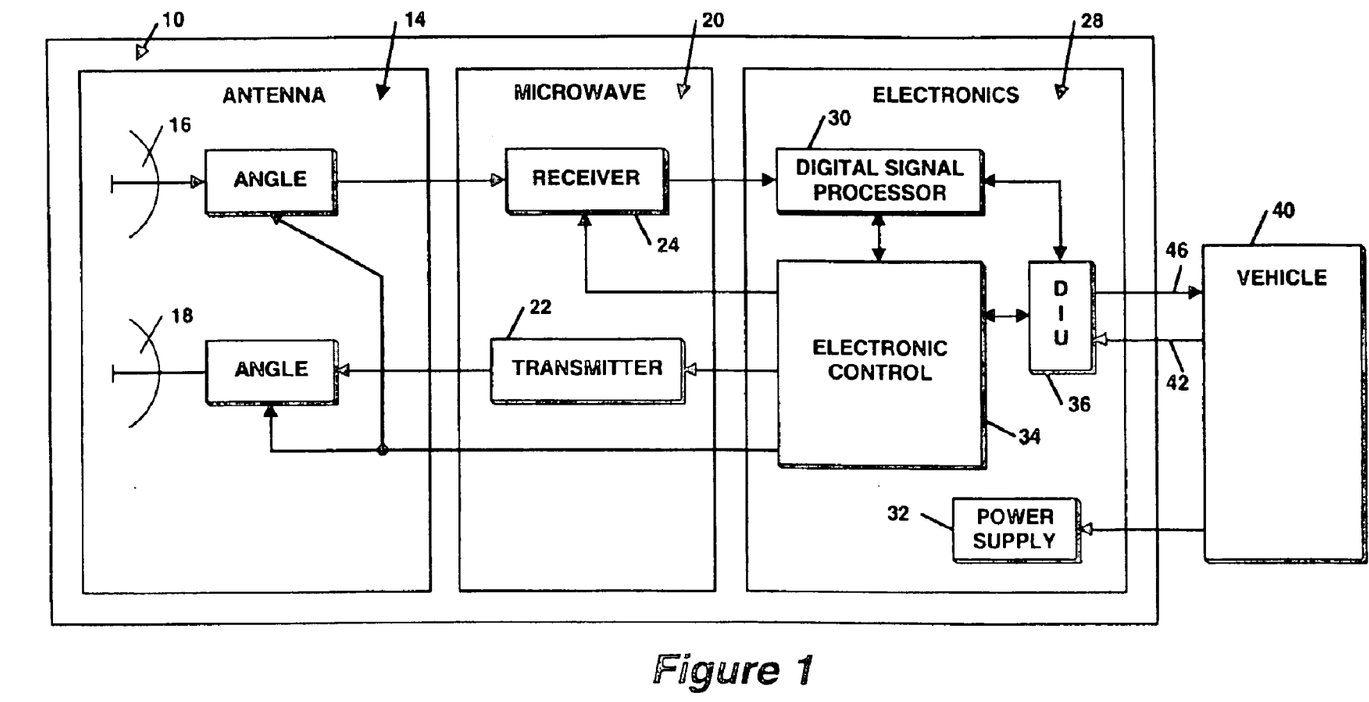
FIG. 1 is a block diagram of a radar system.
Figure 2:
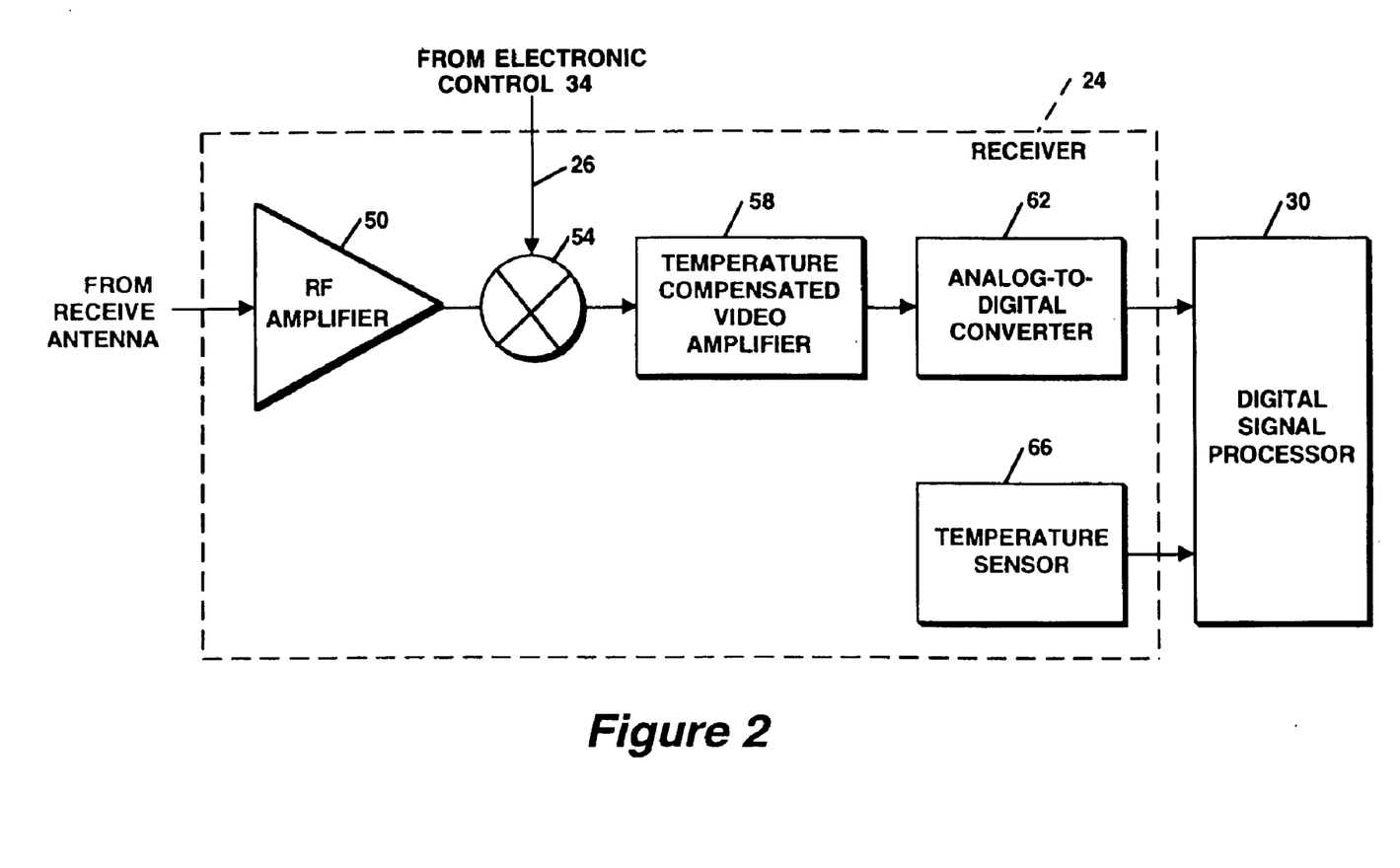
FIG. 2 is a detailed block diagram of an illustrative receiver of the radar system of FIG. 1 including a video amplifier according to the invention.

Referring to FIG. 1, a radar system 10 includes an antenna portion 14, a microwave portion 20 having both a transmitter 22 and a receiver 24, and an electronic portion 28, consisting of a digital signal processor (DSP) 30, power supplies 32, control circuits 34 and a digital interface unit 36. According to the invention, the receiver 24 includes a temperature compensated video amplifier 58 (FIG. 2).

The radar system 10 utilizes radar technology to detect one or more objects, or targets in the field of view of the system and may be used in various applications. In the illustrative example, the radar system 10 is a module of an automotive radar system (FIG. 7), such as a Side Object Detection (SOD) module or system, adapted for mounting on an automobile 40 for the purpose of detecting objects, such as other vehicles, trees, signs, pedestrians, etc. As will become apparent to those of ordinary skill in the art, the video amplifier contained in the receiver according to the present invention is suitable for use in radar receivers of many different types of radar systems used in various applications.

The illustrative transmitter 22 operates as a Frequency Modulated Continuous Wave (FMCW) radar, in which the frequency of the transmitted CW signal linearly increases from a first predetermined frequency to a second predetermined frequency. FMCW radar has the advantages of high sensitivity, relatively low peak transmitter power and good range resolution. However, it will be appreciated that other types of transmitters may be used.

Control signals are provided by the vehicle 40 to the radar system 10 of FIG. 1 via a control signal bus 42. One illustrative control signal is a disable signal for disabling the radar system 10, for example as may be desirable when the vehicle is stationary. In response to these control signals and reflected RF signals received by the radar system 10, the radar system 10 provides one or more output signals associated with an object within its field of view via an output signal bus 46 to the vehicle. In addition to an output signal indicating the presence of a target, a further output signal may indicate the range of the detected target. The output signals may be coupled to a control unit of the vehicle 40 for various uses, such as blind spot and near object detection.

The antenna assembly 14 includes two antenna, a receive antenna 16 for receiving RF signals and a transmit antenna 18 for transmitting RF signals. The radar 10 may be characterized as a bistatic radar sensor since it includes separate transmit and receive antennas positioned proximate one another. Due to the proximity of the transmit and receive antennas, a portion of the transmitted RF signal will coupled directly to the receive antenna without intercepting an object. This directly coupled signal is referred to as a leakage signal and typically occurs at relatively low frequencies. Leakage signals in the illustrative system have been found to occur at approximately 1 KHz. The antennas 16, 18 are multi-lobed and are controlled in parallel as to point in the same direction. Various circuitry for selecting the angle of the respective antennas 16, 18 is suitable, including multi-position transmit and receive antenna switches.

The receiver output is processed by a digital signal processor (DSP) 30 in order to detect an object within the field of view of the radar system, as will be described. The remaining parts of the radar system 10 are standard items, including power supply 32, control circuits 34, including a system clock (crystal controlled oscillator) for frequency stability, and digital interface 36.

It will be appreciated by those of ordinary skill in the art that the particular boundaries between portions of the radar system 10 are somewhat arbitrary and are not fixed. As examples, the receiver 24 may include parts of the electronic control circuits 34 or parts of the receiver, such as an A/D converter (FIG. 2), may be provided in the electronics portion 28 of the system. Depending on the selected implementation of the various components, one or more portions of the radar system may be integrated onto one or more hybrid, ASIC, or integrated circuits, modules, or subassemblies.

Referring also to FIG. 2, the receiver 24 includes a temperature compensated video amplifier 58 according to the invention. The receiver 24 further includes an RF preamplifier, or simply amplifier 50 responsive to RF signals from the receive antenna 16. The output signal of the RF amplifier 50 is down-converted by a mixer 54 which receives a local oscillator signal 26 from the electronic control 34 (FIG. 1). Illustrative frequencies for the RF signals from the amplifier 50 and the local oscillator signal 26 are on the order of 24 GHz and the illustrative receiver 24 is a direct conversion, homodyne receiver. However, it will be appreciated by those of ordinary skill in the art that the signal frequencies may be readily varied to suit a particular application and that other receiver topologies may be used.

The resulting video signal provided by the mixer 54 in FIG. 2 to the temperature compensated amplifier 58 are between 1 KHz to 40 KHz. The video amplifier 58 amplifies and filters the received video signal. Additional functions of the video amplifier include reducing aliasing minimizing leakage signals and providing sensitivity control based on frequency, as will be described.

The receiver 24 further includes an analog-to-digital (A/D) converter, such as a 12 bit converter, which converts the analog output of the video amplifier into a digital signal for further processing. In particular, the signal samples are processed by a fast Fourier transform (FFT) within the DSP 30 in order to determine the content of the return signal within various frequency ranges (i.e., frequency bins). The FFT outputs serve as data for the rest of the signal processor 30 in which one or more algorithms are implemented to detect objects within the field of view. The signal processor 30 may provide various outputs to the vehicle through the digital interface 36 and output bus 46, such as the range and rate of detected objects.

The video amplifier 58 provides a first order temperature compensation to reduce the effect of temperature induced gain variations in the RF amplifier 50. In this way, the dynamic range over which the A/D converter 62 has to operate is reduced. More particularly, RF amplifiers, and particularly those comprised of gallium arsenide (GaAs) transistors, suffer from significant gain variations over temperature. As a typical example, a GaAs amplifier can have a gain variation of 8 dB to 9 dB over a temperature range of −40° C. to +85° C. As will be described further in connection with the video amplifier schematic of FIG. 3, the video amplifier is designed to have a thermal characteristic (i.e., gain versus temperature) which is substantially complementary with respect to the thermal characteristic of the RF amplifier 50 so that the thermal characteristic of the receiver, including both the RF amplifier, and the video amplifier is substantially invariant with respect to temperature. For example, if the gain of the RF amplifier 50 decreases by +8 dB as the temperature ranges from −40° C. to +85° C., then the video amplifier is designed to provide a gain which increases by +8 dB over the same temperature range. However, the thermal characteristic of the RF amplifier 50 and the video amplifier 58 generally will not be precisely complementary at every temperature over the range of interest. That is, the two curves may have one or more common points, but different shapes and/or slopes over portions of the temperature range. Therefore, even with the temperature compensated video amplifier 58, there can still exist some temperature induced gain variations of the RF amplifier 50 that are not fully compensated or nulled.

The receiver 24 further includes a temperature sensor 66 shown in FIG. 2 which generates a signal indicative of temperature for coupling to the digital signal processor 30 for use in performing a final, fine temperature correction in order to complete the temperature compensation of the RF amplifier 50. In the illustrative embodiment, the temperature sensor 66 is a National Semiconductor LM75; however, other temperature sensors may also be used. During manufacture, the radar system 10 is characterized in order to determine precisely how accurately the temperature compensation performed by the video amplifier 58 compensates for the actual temperature induced gain variation of the RF amplifier 50. The result of this characterization is a certain error in the receiver gain over temperature (i.e., an error characteristic).

In operation, the DSP 30 compares the actual temperature as measured by the temperature sensor 66 to the error characteristic in order to determine the gain error at the measured temperature. The gain error is then used to adjust the threshold used by the FFT to determine whether the signal content within a frequency bin is indicative of the presence of an object within the field of view. As one example, a look-up table may be used to provide an adjusted threshold from the gain error. Since temperature generally changes relatively slowly, the temperature sensor output signal may be sampled and processed by the DSP 30 infrequently.

As will be described, the video amplifier 58 has the additional advantages of reducing aliasing, filtering leakage signals and implementing sensitivity control based on the frequency of radar returns. These advantages are achieved by providing the video amplifier with a bandpass characteristic. Sensitivity frequency control is a technique which causes the radar receiver sensitivity to vary with frequency in such a way that the amplified radar return strength is independent of range. This technique is analogous to the conventional technique of sensitivity time control (STC) used in pulse radars in which the receiver sensitivity is made to vary with time in such a way that the amplified radar return strength is independent of range. By tailoring the low frequency roll off, RF signal returns are weighted according to the range of the intercepted target, so that weak returns (which correspond to higher beat frequencies and distant objects) are weighted greater than strong returns (which correspond to lower beat frequencies and close objects). Further, low frequency attenuation causes leakage signals to be filtered. The high frequency cutoff (i.e., the 3 dB point) is selected with knowledge of the sampling rate of the A/D converter 62 in order to reduce aliasing, as will be described. The result of the bandpass filtering provided by the video amplifier is a reduction in the dynamic range over which the A/D converter 62 is required to operate.

Figure 3:
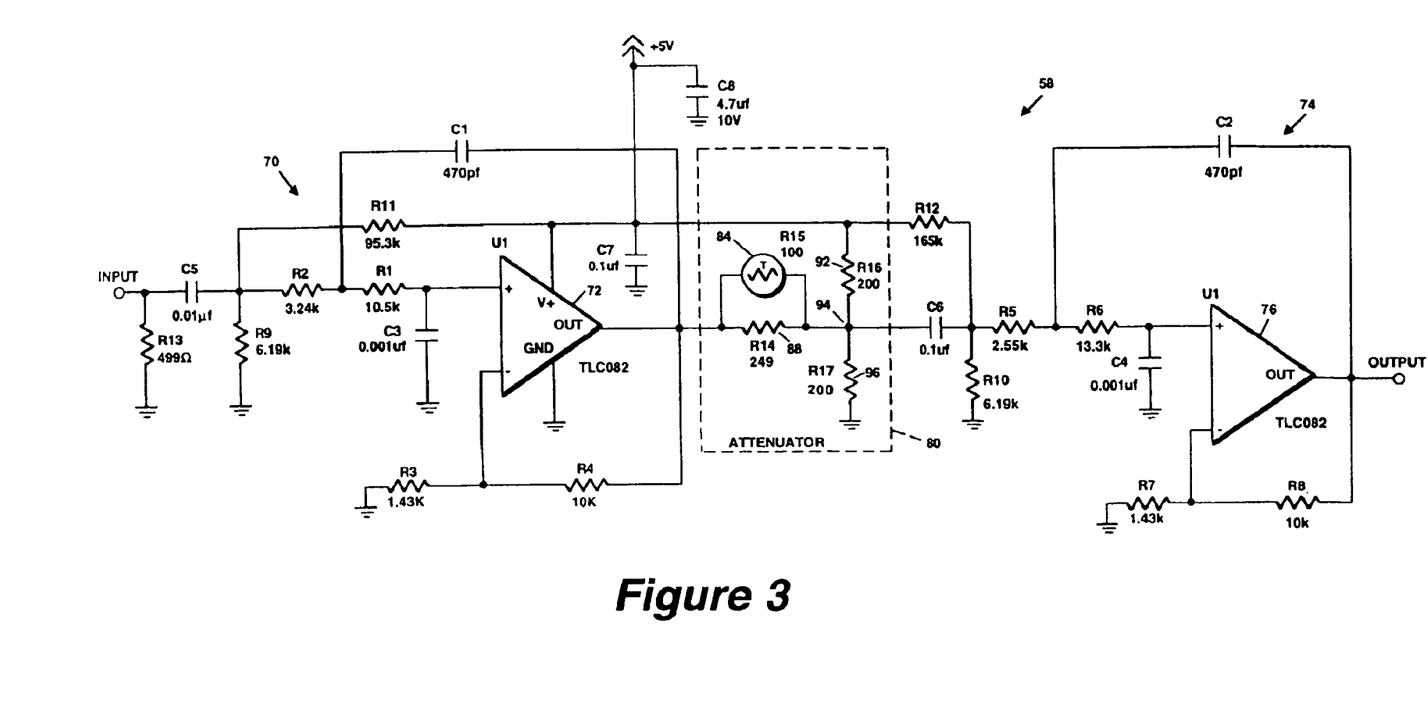
FIG. 3 a schematic of the video amplifier of FIG. 2.

Referring to FIG. 3, the temperature compensated video amplifier 58 includes two filter stages 70, 74 coupled in cascade with the temperature compensating attenuator 80. In the preferred embodiment, the attenuator 80 is positioned between the two filter stages 70, 74. Although design considerations such as noise figure would require careful attention, it is possible to position the attenuator before the first filter stage or after the second filter stage. Each of the filter stages 70, 74 two poles of a four pole Butterworth active low pass filter, with the high pass filtering provided by capacitors C5 and C6. Although the filters 70, 74 are used to generate a Butterworth filter response, it will be appreciated by those of ordinary skill in the art that other filter response types may be used, such as Gaussian or Chebyshev. Each filter stage 70, 74 comprises an operational amplifier 72, 76, respectively, and a resistor/capacitor network in a two pole Sallen Key topology, as shown. Again, it will be appreciated that other filter topologies may be used. In the illustrative embodiment, each filter stage 70, 74 provides approximately 18 dB of gain and, together, provide a high frequency cutoff of approximately 40 KHz for the entire video amplifier, and a low frequency cutoff of approximately 3500 Hz which results in a low frequency cutoff of approximately 1 KHz for the entire video amplifier (see FIG. 6).

The attenuator 80 in the form of a voltage divider includes a temperature sensitive thermistor device 84 in parallel with a resistor 88, with the parallel combination coupled to the interconnection point between series resistors 92 and 96, as shown. As will become apparent to those of ordinary skill in the art, the temperature sensitive, or temperature detecting device 84 may be provided as a thermistor as in the preferred embodiment, a resistive temperature detector (RTD), a thermocouple, a diode or any other device having a resistance that varies in a controlled and defined manner over temperature.

The attenuator 80 is designed to provide a gain versus temperature characteristic which is substantially complementary with respect to the gain versus temperature characteristic of the RF amplifier 50 so that the gain versus temperature characteristic of the entire receiver is substantially invariant with temperature or stated differently, so that the temperature induced gain variation of the RF amplifier 50 is substantially nulled. To this end, during manufacture, the RF amplifier 50 is characterized in order to determine its gain versus temperature characteristic. In the illustrative embodiment, the GaAs RF amplifier 50 has a gain that decreases by approximately 8 dB from a temperature of −40° C. to a temperature of +85° C.

Figure 4:
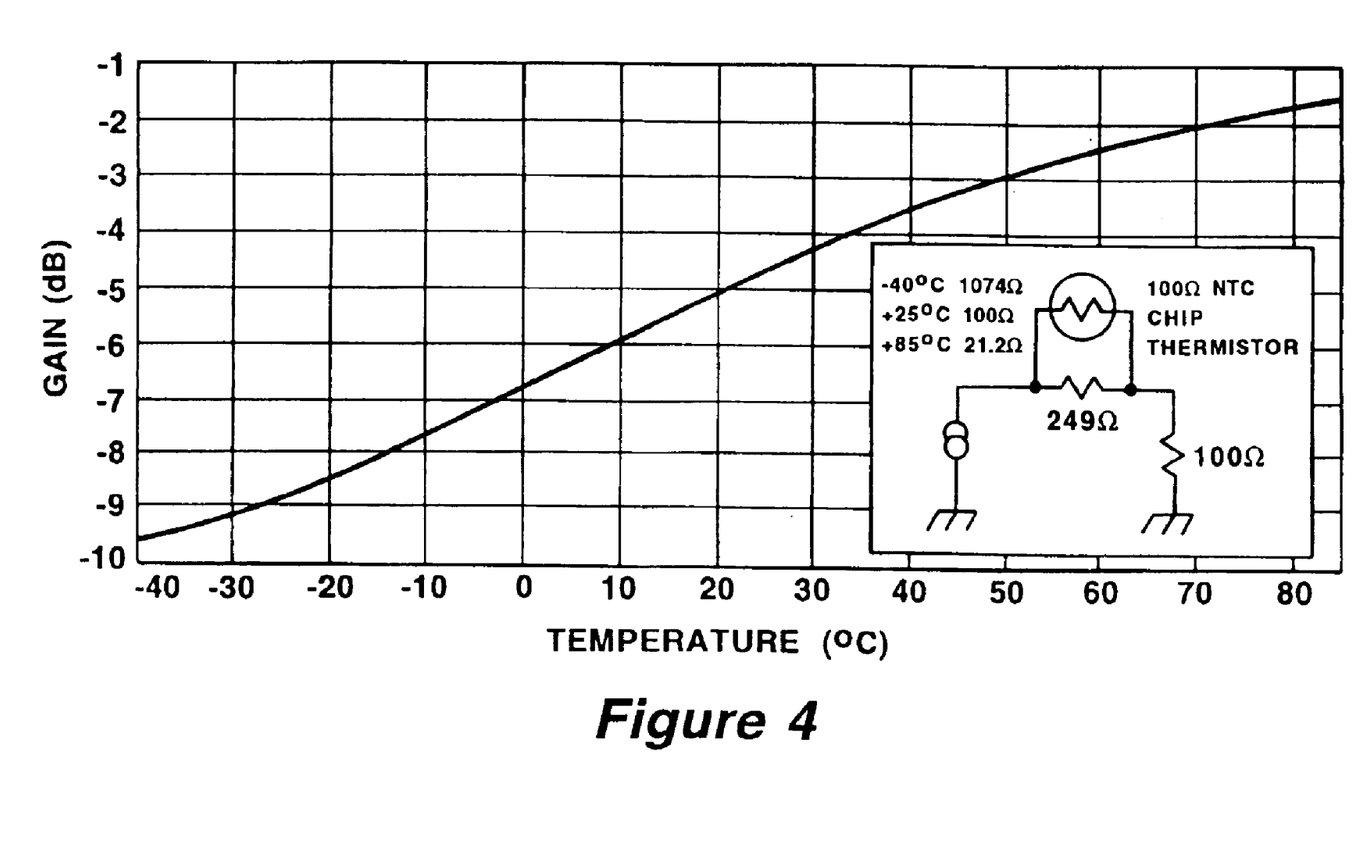
FIG. 4 is a curve illustrating the temperature versus gain relationship for the thermistor attenuator circuit of the video amplifier of FIG. 3.

The illustrative attenuator 80 has a gain versus temperature characteristic as shown in FIG. 4. In general, the attenuator 80 has a maximum attenuation value at low temperatures and reduced attenuation at higher temperatures in order to compensate the gain variations in the RF amplifier. In particular, the attenuator 80 has a gain of approximately −9.5 dB at −40° C., −4.5 dB of gain at +25° C., and −1.5 dB at +85° C. in order to compensate a gain versus temperature characteristic of the RF amplifier 50 which is +9.5 dB higher than desired at −40° C., +4.5 dB higher than desired at 25° C., and +1.5 dB higher than desired at +85° C.

The illustrative thermistor 84 is a negative temperature coefficient Panasonic ERT-J0EA101J device having a resistance of 1074 ohms at −40° C., 100 ohms at +25° C., and 21.2 ohms at +85° C. It will be appreciated that other thermistors having similar characteristics are also suitable. Although the thermistor attenuation is in the right direction (i.e., more attenuation at low temperatures than at high temperatures) to compensate for the RF amplifier temperature induced gain variation, the attenuation by the thermistor alone (coupled in a voltage divider arrangement with an effective resistance of 100 ohms provided by resistors 92 and 96) would be −12.4 dB at −40° C., −6 dB at +25° C. and −1.67 dB at +85° C., which would result in too large an attenuation range. As a result, parallel resistor 88 is used to adjust the attenuation range of the thermistor and improves the linearity of the gain versus temperature characteristic of the attenuator.

The value of the resistor 88 is selected using an iterative process in order to substantially complement the RF amplifier thermal characteristic curve. In the illustrative embodiment, resistor 88 has a value of 249 ohms. With this arrangement, at −40° C., the equivalent resistance of the thermistor 84 and resistor 88 is 202 ohms resulting in an attenuation ratio of 0.331, or −9.6 dB. At +25° C., the parallel thermistor 82 and resistor 88 provide an equivalent resistance of 71.35 ohms and the voltage divider network provides an attenuation ratio of 0.584, or −4.7 dB. Further, at +85° C., the parallel thermistor 82 and resistor 88 provide an equivalent resistance of 19.5 ohms and the voltage divider network provides an attenuation ratio of 0.836, or −1.6 dB. The attenuator gain versus temperature thermal characteristic is shown in FIG. 4.

It will be appreciated by those of ordinary skill in the art that various changes can be made to the attenuator 80 without departing from the spirit of the invention. For example, the attenuator may be designed using a positive temperature coefficient device and the topology of the attenuator elements may be modified from the illustrated voltage divider arrangement, while still providing the necessary attenuation in order to substantially complement the gain versus temperature characteristic of the RF amplifier.

The values of resistors 92 and 96 are selected so that the output of the operational amplifier 72 is biased to have a nominal value of Vcc/2, or 2.5 volts, which is equal to the nominal voltage at the output node 94 of the attenuator. With this arrangement, only AC current flows through the thermistor 84, thereby preventing heating from DC current which would cause the resistance of the thermistor to change. The operational amplifier 76 is biased to provide a nominal output voltage on the order of 1.5 volts which corresponds to the midpoint of the voltage range of the A/D converter 62 in FIG. 2.

Figure 5:
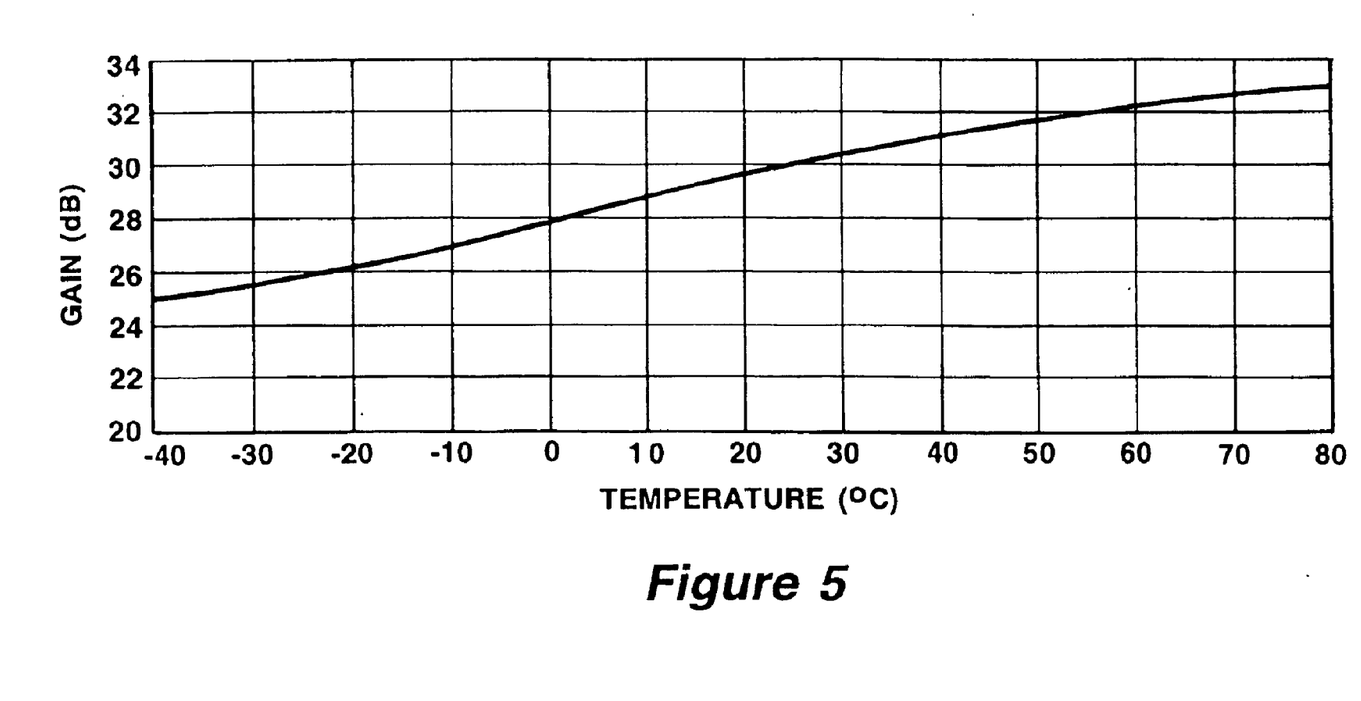
FIG. 5 is a curve illustrating the temperature versus midband gain relationship for the video amplifier of FIG. 3.

Referring to FIG. 5, the gain versus temperature characteristic of the entire video amplifier 58 is shown. As is apparent, the video amplifier provides approximately 30 dB of gain at 25° C. and varies by the desired 9 dB over the illustrated temperature range.

Figure 6:
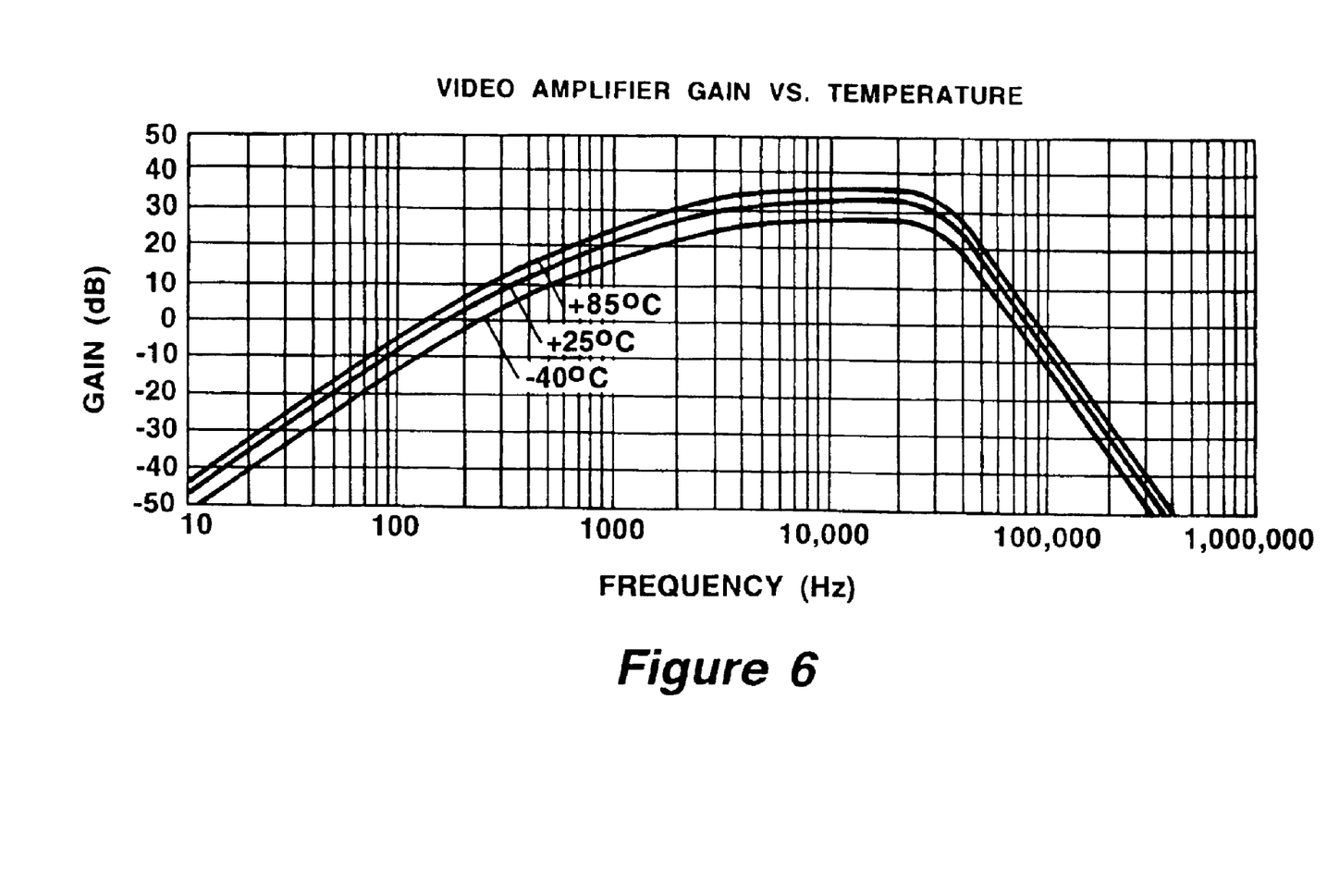
FIG. 6 is a curve illustrating the frequency versus gain relationship for the video amplifier of FIG. 3 at three different temperatures.

Referring to FIG. 6, the frequency response of the video amplifier 58 of FIG. 3 is shown. As noted above, the passband cutoff frequencies are approximately 3.5 KHz and 40 KHz since these frequencies correspond to frequencies of radar returns from objects within a range of interest (i.e., from approximately 1–30 meters).

The high frequency cutoff is selected to reduce aliasing. In the illustrative embodiment, the A/D converter 62 samples at a rate on the order of 230 KHz –250 KHz. The 40 KHz high frequency cutoff point is sufficient to reduce the effects of aliasing since signals having frequencies of 115 KHz or greater are significantly attenuated, thereby ensuring that the sampling rate is at least two times the frequency of the highest frequency sampled signal.

The attenuation of low frequency signals serves to filter leakage signals and implement sensitivity control based on frequency and therefore range. Leakage signals in the illustrative radar system 10 have been found to have a frequency on the order of 1 KHz. Various factors determine the frequency of the leakage signals, including but not limited to the time delay of the leakage signal relative to the mixer local oscillator signal. The low frequency cutoff of 3.5 KHz causes such leakage signals to be attenuated. Further, this attenuation of low frequency signals provides sensitivity frequency control since higher frequency returns which correspond to weaker return signals from distant objects are weighted more heavily than lower frequency returns which correspond to stronger return signals from close objects. In the illustrative radar system 10, objects located on the order of one meter from the radar system will provide a return frequency on the order of 1 KHz and such returns will be attenuated by a reduction in gain on the order of 10 dB. Whereas, an object of the same cross-section located ten meters from the radar system will provide a return frequency on the order of 12 KHz. With this signal attenuation, the disparity between the amplitude of the two returns is reduced, thereby reducing the dynamic range over which the A/D converter is required to operate.

It will be appreciated by those of ordinary skill in the art that the particular high pass cutoff and slope can be readily varied by changing one or more component values in the filter stages 70, 74 in order to provide a desired characteristic. In general, the roll-off characteristic is selected to attenuate leakage signals and to implement sensitivity frequency control by adding more gain to returns from distant objects than to returns from close objects, with the demarcation between distant objects and close objects being a parameter particular to the application of the radar system.

Figure 7:
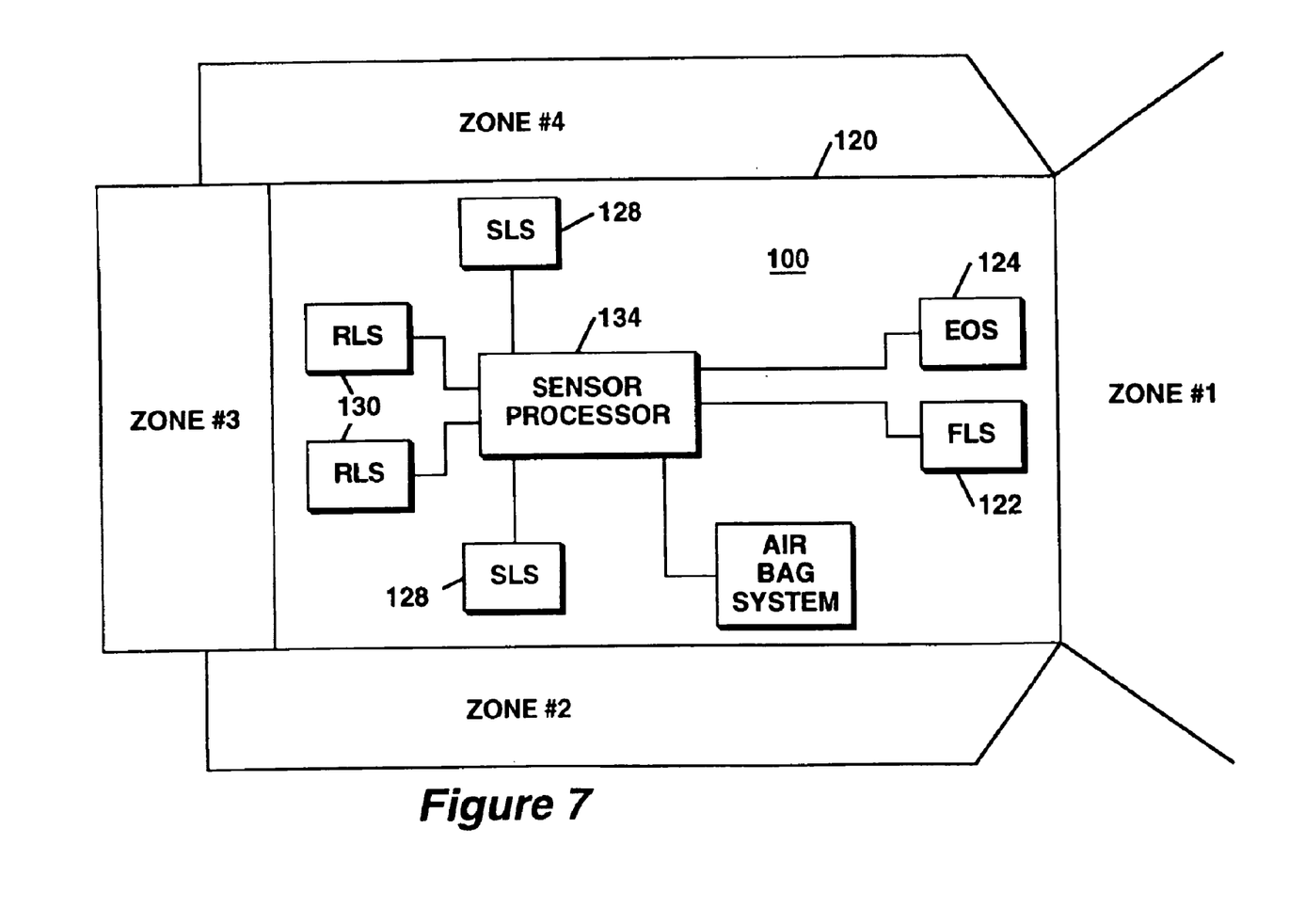
FIG. 7 is a block diagram of an automotive Near Object Detection system including the radar system of FIG. 1.

Referring to FIG. 7, an illustrative application for the radar system 10 of FIG. 1 is shown in the form of an automotive Near Object Detection (NOD) system 100. The NOD system 100 is disposed on a vehicle 120 which may be provided for example, as an automotive vehicle such as car, motorcycle, or truck, or a marine vehicle such as a boat or an underwater surface vehicle or as an agricultural vehicle such as a harvester. In this particular embodiment, the NOD system 100 includes a forward-looking sensor (FLS) system 122, an electro-optic sensor (EOS) system 124, a plurality of side-looking sensor (SLS) systems 128 and a plurality of rear-looking sensor (RLS) systems 130.

Each of the SLS systems 128 may be referred to as a side object detection (SOD) system and may take the form of the radar system 10 shown in FIG. 1 and including the receiver 24 of FIG. 2 which, in turn, includes the video amplifier of FIG. 3. Further, parts or all of the radar system 10 of FIGS. 1–3 may be used to implement the other sensor systems such as the RLS systems. As one example, the video amplifier 58 of the present invention may be incorporated into one or more of the FLS, EOS, SLS, and RLS sensor systems of the NOD system 100.

Each of the FLS, EOS, SLS, and RLS systems is coupled to a sensor processor 134. In this particular embodiment, the sensor processor 134 is shown as a central processor to which each of the FLS, EOS, SLS, and RLS systems is coupled via a bus or other means. It should be appreciated that in an alternate embodiment, one or more of the FLS, EOS, SLS, and RLS systems may include its own processors to perform the processing described below, such as the DSP 30 of FIG. 1. In this case, the NOD system 100 would be provided as a distributed processor system.

Regardless of whether the NOD system 100 includes a single or multiple processors, the information collected by each of the sensor systems is shared and the processor (or processors in the case of a distributed system) implements a decision or rule tree. The NOD system 100 may be used for a number of functions including but not limited to blind spot detection, lane change detection, pre-arming of vehicle air bags and to perform a lane stay function. For example, the sensor processor 134 may be coupled to the airbag system of the vehicle. In response to signals from one or more of the FLS, EOS, SLS, and RLS systems, the sensor processor may determine that it is appropriate to "pre-arm" the airbag of the vehicle. Other examples are also possible.

The EOS system includes an optical or IR sensor or any other sensor which provides good or high resolution in the azimuth direction of the sensor. The pair of RLS sensors can utilize a triangulation scheme to detect objects in the rear portion of the vehicle. The FLS sensor is described in U.S. Pat. No. 5,929,802 entitled AUTOMOTIVE FORWARD LOOKING SENSOR APPLICATION issued on Jul. 27, 1999, assigned to the assignee of the present invention and incorporated herein by reference. It should be appreciated that each of the SLS and RLS sensors may be provided having the same antenna system.

Each of the sensor systems is disposed on the vehicle such that a plurality of coverage zones exist around the vehicle. Thus, the vehicle is enclosed in a cocoon-like web of sensor zones. With the particular configuration shown in FIG. 7, four coverage zones are used. Each of the coverage zones utilizes RF detection systems. The RF detection system utilizes an antenna system which provides multiple beams in each of the coverage zones. In this manner, the particular direction from which another object approaches the vehicle or vice-versa can be found.

It should be appreciated that the SLS, RLS, and the FLS systems may be removably deployed on the vehicle. That is, in some embodiments the SLS, RLS, and FLS sensors may be disposed external to the body of the vehicle (i.e. on an exposed surface of the vehicle body), while in other systems the SLS, RLS, and FLS systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable.

Having described the preferred embodiments of the invention, it will now become apparent to one of ordinary skill in the art that other embodiments incorporating their concepts may be used. For example, it will be appreciated by those of ordinary skill in the art that receiver topologies other than the illustrated direct conversion, homodyne receiver of FIG. 2 may benefit from the described video amplifier. It will also be appreciated that the video amplifier of the present invention can be designed to compensate for temperature induced gain variations of circuit elements or groups of elements in addition to, or instead of the RF amplifier 50. For example, the attenuator 80 can be designed to compensate for temperature induced gain variations of the entire receiver by characterizing the thermal response of the receiver and designing the attenuator to have a thermal characteristic curve with one or more points complementary with respect to one or more points on the thermal characteristic curve of the receiver.

It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A video amplifier comprising:
    a first filter stage having an input terminal adapted to receive an RF signal and an output terminal;
    an attenuator having an input terminal coupled to the output terminal of said first filter stage and an output terminal, said attenuator comprising a temperature sensitive device; and
    a second filter stage having an input terminal coupled to the output terminal of the attenuator and an output terminal at which an output signal of said video amplifier is provided.

2. The video amplifier of claim 1 wherein said temperature sensitive device is a thermistor.

3. The video amplifier of claim 1 wherein each of said first filter stage and said second filter stage comprises a Sallen-Key filter.

4. The video amplifier of claim 1 wherein each of said first filter stage and said second filter stage has a low-pass characteristic.

5. The video amplifier of claim 1 wherein each of said first filter stage and said second filter stage has a bandpass characteristic.

6. A radar receiver comprising:
    an RF amplifier having an input terminal adapted to receive an RF signal and an output terminal at which an amplified RF signal is provided;
    a down-converter having an input terminal coupled to said output terminal of said RF amplifier and an output terminal at which a lower frequency signal is provided; and
    a video amplifier having an input terminal coupled to said output terminal of said down-converter and an output terminal at which a filtered signal is provided, wherein said video amplifier comprises a temperature compensating attenuator.

7. The radar receiver of claim 6 wherein said RF amplifier is comprised of GaAs transistors.

8. The radar receiver of claim 6 wherein said attenuator comprises a thermistor.

9. The radar receiver of claim 8 wherein said attenuator further comprises at least one resistor coupled to said thermistor to form a voltage divider.

10. The radar receiver of claim 9 wherein each of said first filter stage and said second filter stage has a bandpass characteristic.

11. The radar receiver of claim 10 wherein said bandpass characteristic has a low frequency cutoff selected to attenuate a leakage signal.

12. The radar receiver of claim 10 wherein said bandpass characteristic has a low frequency cutoff selected to attenuate a received RF signal reflected by an object located more than a predetermined distance from said RF receiver.

13. The radar receiver of claim 6 said video amplifier further comprises:
   a first filter stage having an input terminal coupled to said output terminal of said down-converter and an output terminal coupled to said temperature compensating attenuator; and
   a second filter stage having an input terminal coupled to said temperature compensating attenuator and an output terminal at which said filtered signal is provided.

14. A radar system comprising:
   a transmit antenna for transmitting a first RF signal;
   a receive antenna for receiving a second RF signal; and
   a receiver circuit coupled to said receive antenna for processing said second RF signal and comprising a temperature compensated video amplifier.

15. The radar system of claim 14 wherein said temperature compensated video amplifier comprises:
   a first filter stage having an input terminal adapted to receive said second RF signal and an output terminal;
   an attenuator having an input terminal coupled to the output terminal of said first filter stage and having an output terminal, said attenuator comprising a temperature sensitive device; and
   a second filter stage having an input terminal coupled to the output terminal of the attenuator and an output terminal at which an output signal of said video amplifier is provided.

16. The radar system of claim 15 wherein said receiver circuit further comprises an RF amplifier having a gain which varies by a first predetermined amount with temperature and wherein said attenuator provides a gain which varies by a second predetermined amount with temperature, wherein said first and second predetermined amounts are substantially equal.

17. The radar system of claim 15 further comprising:
   an analog-to-digital converter responsive to said output signal of said video amplifier for providing a digital signal;
   a temperature sensor for providing a signal indicative of the temperature of said receiver circuit; and
   a digital signal processor responsive to said temperature indicative signal for varying a threshold used to process said digital signal.

18. The radar system of claim 14 wherein each of said first filter stage and said second filter stage has a bandpass characteristic.

19. The radar system of claim 18 wherein said second RF signal includes a portion of said first RF signal and wherein said bandpass characteristic has a low frequency cutoff selected to attenuate said portion of said first RF signal.

20. The radar system of claim 18 wherein said bandpass characteristic has a low frequency cutoff selected to attenuate a received RF signal reflected by an object located more than a predetermined distance from said radar system.

* * * * *

UNITED STATES PATENT AND TRADEMARK OFFICE
CERTIFICATE OF CORRECTION

PATENT NO. : 6,903,679 B2
DATED : June 7, 2005
INVENTOR(S) : James T. Hanson et al.

It is certified that error appears in the above-identified patent and that said Letters Patent is hereby corrected as shown below:

<u>Column 3,</u>
Line 5, delete "FIG. 3 a" and replace with -- FIG. 3 is a --.
Line 62, delete "two antenna," and replace with -- two antennas, --.

<u>Column 9,</u>
Line 51, delete "of vehicle" and replace with -- of the vehicle --.

Signed and Sealed this

Fourth Day of April, 2006

JON W. DUDAS
*Director of the United States Patent and Trademark Office*